US006070710A

United States Patent [19]
Hutchinson

[11] Patent Number: 6,070,710
[45] Date of Patent: Jun. 6, 2000

[54] PHOTOELECTRIC MEASUREMENT METHOD AND APPARATUS AND BANKNOTE VALIDATION

[75] Inventor: Derek Hutchinson, Berkshire, United Kingdom

[73] Assignee: Mars Incorporated, McLean, Va.

[21] Appl. No.: 09/206,608

[22] Filed: Dec. 7, 1998

[30] Foreign Application Priority Data

Dec. 10, 1997 [GB] United Kingdom .................. 9726135

[51] Int. Cl.[7] .............................. G06K 7/08; H01J 40/14
[52] U.S. Cl. ...................................... 194/207; 250/214 R
[58] Field of Search ............................ 194/207; 250/556, 250/214 R

[56] References Cited

U.S. PATENT DOCUMENTS

| | | | |
|---|---|---|---|
| 3,927,977 | 12/1975 | Jacobs . | |
| 4,047,113 | 9/1977 | Stuermer . | |
| 4,140,952 | 2/1979 | Miller . | |
| 4,184,081 | 1/1980 | Bergamini . | |
| 4,199,816 | 4/1980 | Humphrey . | |
| 4,406,996 | 9/1983 | Oka . | |
| 4,550,433 | 10/1985 | Takahashi . | |
| 4,588,292 | 5/1986 | Collins . | |
| 4,611,124 | 9/1986 | Schneider . | |
| 4,618,257 | 10/1986 | Bayne et al. . | |
| 4,651,292 | 3/1987 | Jeenicke et al. . | |
| 4,719,345 | 1/1988 | Arita | 240/214 R |
| 4,769,532 | 9/1988 | Kawakami . | |
| 4,797,546 | 1/1989 | Berger et al. | 250/214 R |
| 4,802,012 | 1/1989 | Nobue et al. . | |
| 4,947,441 | 8/1990 | Hara et al. . | |
| 4,987,294 | 1/1991 | Romer | 250/208.1 |
| 5,001,415 | 3/1991 | Watkinson . | |
| 5,023,704 | 6/1991 | Hieda et al. . | |
| 5,027,415 | 6/1991 | Hara et al. | 382/135 |
| 5,199,543 | 4/1993 | Kamagami et al. . | |
| 5,339,176 | 8/1994 | Smilansky et al. . | |
| 5,367,154 | 11/1994 | Pfeiffer | 250/208.1 |

FOREIGN PATENT DOCUMENTS

| | | | |
|---|---|---|---|
| 0 519 105 A1 | 12/1992 | European Pat. Off. . | |
| 0 675 345 A2 | 10/1995 | European Pat. Off. . | |
| 3-14195 | 1/1991 | Japan | 194/207 |
| 1384501 | 2/1975 | United Kingdom . | |
| 1442485 | 7/1976 | United Kingdom . | |
| 1470737 | 4/1977 | United Kingdom . | |
| 2 156 975 | 10/1985 | United Kingdom . | |

OTHER PUBLICATIONS

Nowotny, R., "Photocurrent–to–frequency converter notes light levels", Electronics, Feb. 10, 1982, pp. 141, 143.

Burke et al., "Linear Angle Encoder", IBM Technical Disclosure Bulletin, vol. 15, No. 12, May 1973, pp. 3825–3826.

*Primary Examiner*—Robert P. Olszewski
*Assistant Examiner*—Bryan Jaketic
*Attorney, Agent, or Firm*—Fish & Richardson P.C.

[57] ABSTRACT

A photoelectric measurement is made by charging (or discharging) a capacitor at a charge rate dependent on the intensity of the light received by a sensor. The time taken for the charge level to change by a predetermined amount is measured, and the operation is repeated, with the time intervals being accumulated, for a number of times, the number being dependent on the charge rate, so as to enhance resolution of high-intensity measurements. A single comparator is used to detect when the charge level passes through a first level, to initiate the timing, and through a second level, to stop the timing, by altering the threshold level so as to avoid errors due to varying propagation delays.

32 Claims, 4 Drawing Sheets

PHOTOELECTRIC MEASUREMENT METHOD AND APPARATUS AND BANKNOTE VALIDATION

This invention relates to a method and apparatus for making photoelectric measurements, and is particularly, but not exclusively, concerned with measuring the light reflected from and/or transmitted through an article of value, such as a currency article, e.g. a banknote.

Conventional banknote validation techniques involve making a photoelectric measurement using a light source, such as an LED, and a photosensor, with the banknote in the path of light from the source to the sensor, and arranged so as either to reflect the light or transmit the light. A problem with such arrangements is that the operating characteristics of the light source and the light sensor tend to vary substantially, not only between different components, but also within the lifetime of the components. Accordingly, unless special measures are taken, then depending upon the characteristics of the components a particular measurement may vary by a factor of e.g. 10 to 12. Calibration techniques can be used to compensate for this variability, but nevertheless the wide dynamic range requirements can result in quantisation errors. The problem is exacerbated by the fact that the reflectivity and/or transmissivity of a banknote can also vary substantially, e.g. by a factor of about 40, and this greatly increases the dynamic range requirements, and consequently produces greater quantisation errors.

One approach to mitigating this problem has been to incorporate circuits which perform electrical adjustments to compensate for variability in the component performance. For example, the light source can be driven using a digital to analog converter, and a control circuit can be arranged to alter the digital signal provided to the converter so as to ensure that the light source output is maintained at a consistent level. Similarly, the sensor output can be fed to a programmable gain unit which is adjusted to compensate for varying response characteristics of the sensor. Although this deals with the problem of component variability, it leads to a further difficulty. This arises from the fact that it is desirable to perform several different measurements simultaneously as the banknote is being scanned, using different source/sensor pairs (see, for example, EP-A-0 537 431). It is convenient to use a single drive circuit for all the light sources. However, if that circuit includes a digital to analog converter for performing an adjustment depending upon the characteristics of the LED, then it is no longer possible to carry out simultaneous measurements; instead, each measurement must be preceded by a period in which the input to the digital to analog converter is varied, and a further period to allow time for the adjusted signals to settle. Accordingly, either the scanning rate is decreased, or a smaller proportion of the banknote is scanned.

Even in such an arrangement, there remain the quantisation errors due to the dynamic range requirements attributed to the variability of banknote reflectance or transmissivity.

According to one aspect of the present invention, a photoelectric measurement is made using a charge storage device, by altering the charge stored by the device at a rate dependent upon the intensity of light received by a sensor, and measuring either the time taken for the charge level to change by a predetermined amount or the charge level after a predetermined period, and by accumulating several such measurements. Preferably, the number depends upon the charge rate.

By charging (or discharging) a charge storage device (e.g. a capacitor) at a rate dependent upon the intensity received by a sensor, it is possible to deduce the intensity level from the time taken to alter the charge by a predetermined amount. However, if the intensity is high, the charge will alter quickly, so that a measurement of the time taken for the charge to change by a predetermined amount will exhibit relatively low resolution.

The present invention envisages repeating the individual measurement a variable number of times, the number being greater for higher charge (or discharge) rates (normally associated with high intensities). The final measurement is based on an accumulation of the individual measurements. Thus, a high-intensity measurement can be made by finding out the accumulated amount of time taken to change the charge level by a predetermined amount a plurality of times, thereby improving the resolution.

Alternatively, an individual measurement can be made by determining how much the charge has changed within a predetermined period. In the prior art, high-intensity measurements would give rise to a large change in the charge level, the resulting charge level being subjected to analog-to-digital conversion to give a reading at substantially the maximum output of the analog-to-digital converter. For low intensity measurements, however, the charge level will differ by a substantially lower amount, and thus quantisation errors would have a proportionately greater effect. According to an aspect of the present invention, however, the measurement is repeated, and the results are accumulated to improve accuracy. Because each individual measurement takes a predetermined amount of time, using this technique the number of measurements may simply correspond to the maximum possible in the time available, and thus be the same irrespective of intensity.

The former technique, which involves repeatedly measuring the time taken for the charge to change by a predetermined amount, is preferred because it does not involve multiple analog-to-digital conversions.

The techniques of the present invention therefore solve or mitigate the problems resulting from a large dynamic range requirement. As a result, it is no longer necessary to perform electrical adjustments within the sensor circuitry so the cost of the digital-to-analog converters and programmable gain units, and the additional problems mentioned above, can be avoided.

In prior art circuits in which a photosensor output has been measured by determining the time taken for the charge to change by a predetermined amount, the technique normally used is to initiate, simultaneously, a charging (or discharging) operation and a timing operation and then to terminate the timing operation when the charge level reaches a predetermined threshold. According to another, independent, aspect of the invention, there is a delay between the start of a charge/discharge operation and the beginning of a measurement. This mitigates the problem of timing inaccuracies due to propagation delays in the components which initiate the charge/discharge operation. In the preferred embodiment, a charge/discharge operation is initiated, a timing operation begins when the charge level reaches a first threshold and the measurement is obtained by determining the timing when a second threshold is reached (or by determining the charge level when a predetermined time period has been measured).

Preferably, a timing operation is initiated when a comparator detects that the charge has reached a first threshold level determined by a signal applied to a threshold input, this signal is then changed to correspond with a second threshold level and the timing operation is terminated when the charge reaches that second threshold level. Separate comparators could be used for detecting, respectively, the first and second threshold levels. However, timing inaccuracies may arise due to differences between propagation delays within the comparators, and particularly due to the fact that such differences may be dependent on the rate of change of the charge level. By using a single comparator and varying the signal applied to the threshold input, such timing inaccuracies can be avoided.

This aspect of the invention is preferably combined with the first-mentioned aspect, so that each individual sensor measurement is initiated following a delay period after the start of a charge or discharge operation. Preferably, this delay period is different for different individual measurements. The initiation of the charging/discharging operation may be controlled in synchronism with the clock pulses which are used for timing. By varying the delay period, it is possible to destroy any synchronism there may be between the clock pulses and the beginning of the individual measurements, so that if there are rounding errors in the measurements, these are averaged out instead of accumulating.

Other aspects of the invention are set out in the accompanying claims. The invention also extends to apparatus, such as a currency validator, using the techniques of the method of the invention.

Arrangements embodying the invention will now be described by way of example with reference to the accompanying drawings, in which:

FIG. 1 schematically shows the sensor arrangement in a banknote validator in accordance with the invention;

Figure 1:
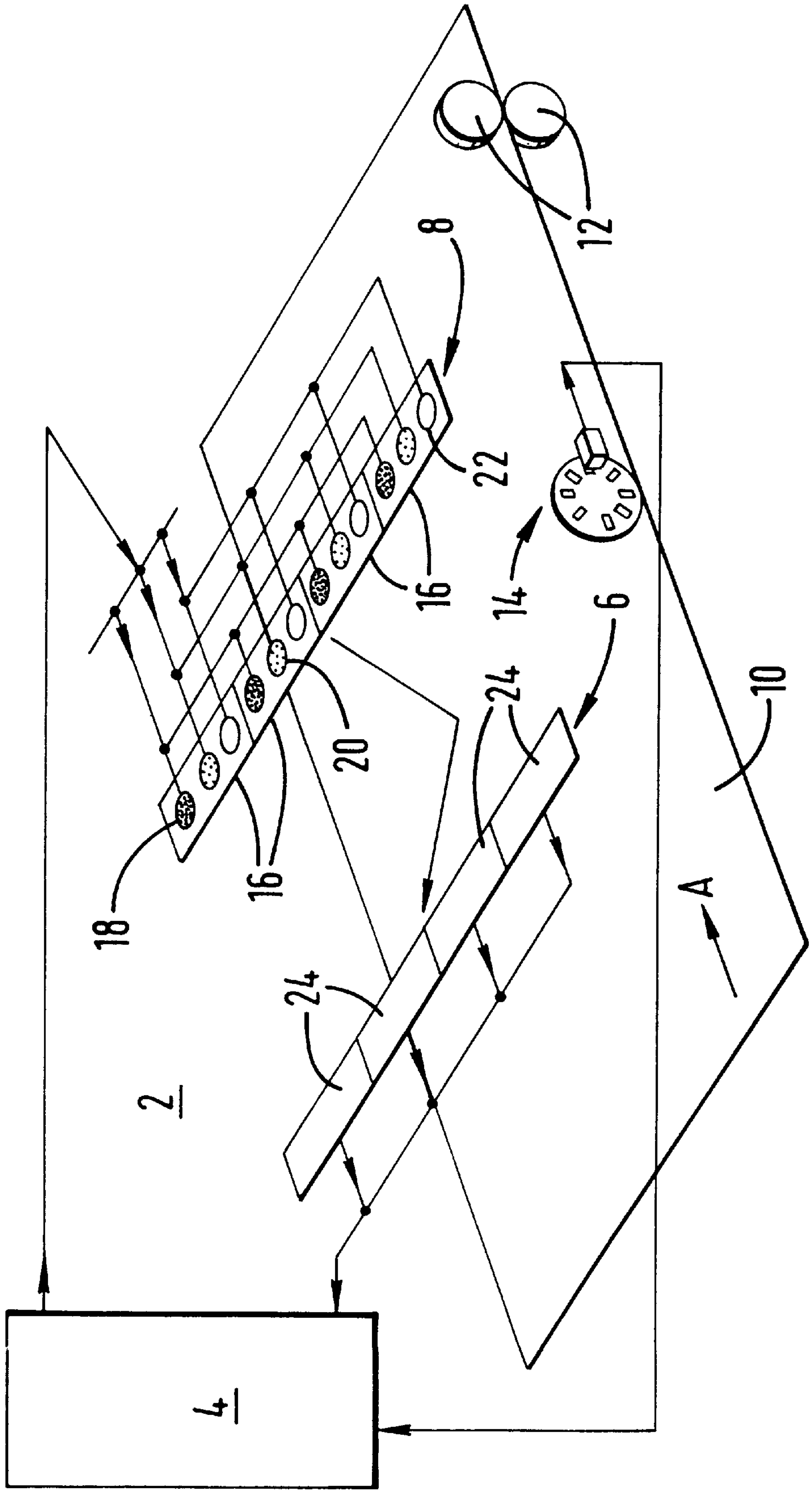

Referring to FIG. 1, a banknote validator 2 has a circuit 4 connected to a sensor array 6 and to an array 8 of LEDs. The LEDs of the array 8 are arranged to illuminate a banknote 10 so that it can be scanned by the sensor array 6 as it is moved in the direction A of its length by a pair of rollers 12, one of which is driven at a suitable scanning speed. A tachographic sensor 14 produces a pulse each time the banknote is moved in the scanning direction by a predetermined distance.

The LED array 8 comprises a number (four in the illustrated embodiment) of sections 16, each of which contains a plurality of LEDs of different colours, e.g. a red LED 18, a green LED 20 and an infrared LED 22. LEDs of the same colour in respective sections 16 are coupled in series, and can be driven simultaneously by a drive circuit (not shown). The drive circuit is arranged to drive the LEDs of the different colours in succession.

The sensor array 6 has a plurality of individual sensors 24, each for receiving the light from the LEDs in the corresponding section 16 of the LED array 8, after reflection from an area of the banknote 10.

The validator circuit 4 contains a drive circuit for driving the LED's, and measuring circuits for receiving the signals from the sensors 24 and deriving measurements therefrom. In operation, all LED's of the same colour are driven simultaneously, using a common drive signal, and measurements are simultaneously made based on the outputs of the sensors 24. It is not necessary to make the measurements in succession, because there is no need to alter the driving current individually for each LED.

After one set of measurements has been made, LED's of a different colour are driven, so that the respective different colour measurements are obtained in succession.

Figure 2:
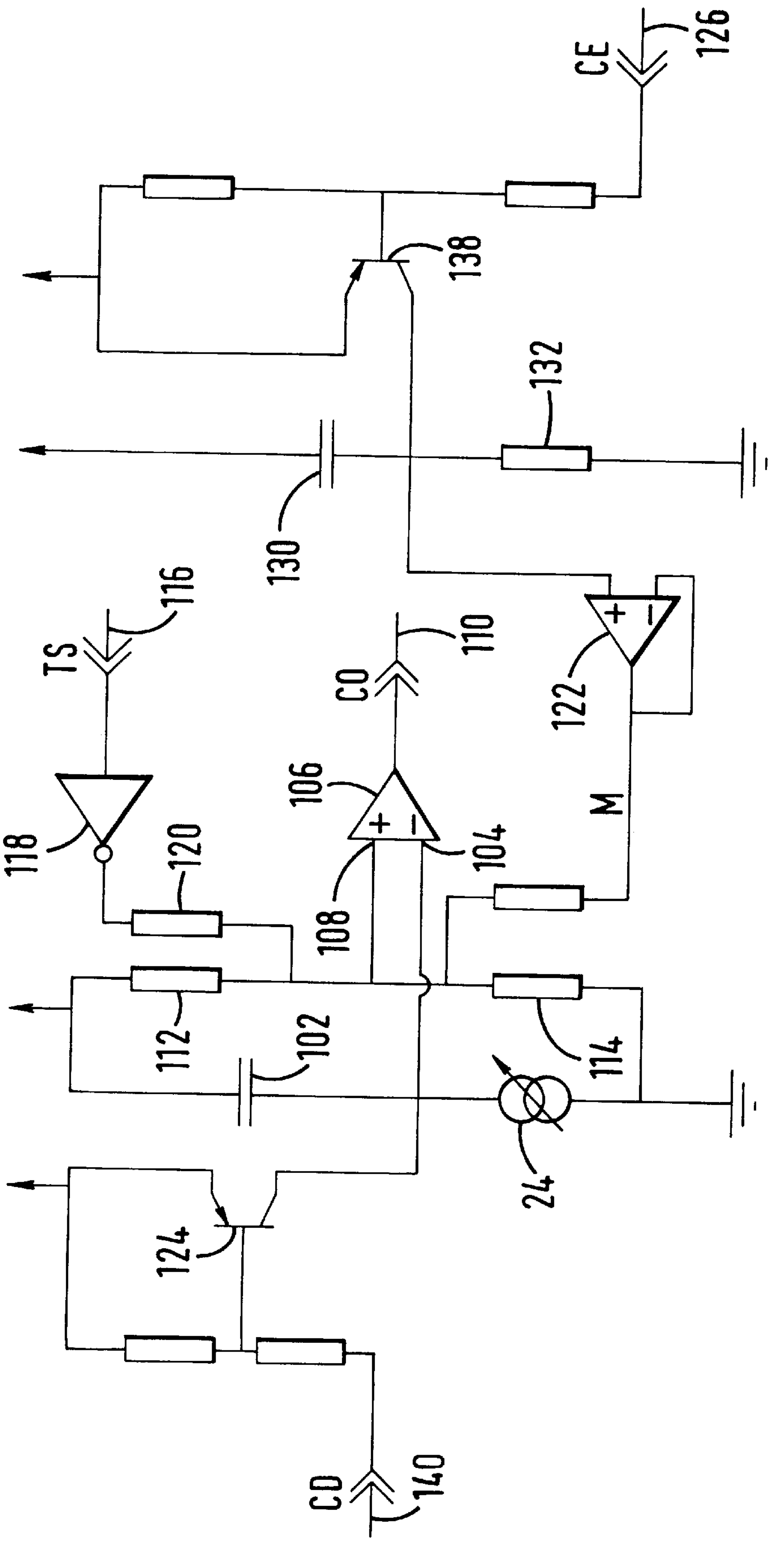
FIG. 2 is a circuit diagram of an analog part of the validation circuit of the validator.

FIG. 2 shows the analog circuit for one of the sensors 24; the circuits for the other sensors are similar. In FIG. 2, the sensor 24 is represented by a variable current sink, and is coupled to a capacitor 102, the other side of which is connected to a supply rail. This means that the charge on the capacitor, and thus the voltage at the junction between the sensor 24 and the capacitor, will vary at a rate dependent on the intensity of light received by the sensor. This junction is coupled to a first input 104 of a comparator 106, the comparator having a second input 108 for receiving a threshold signal. The output of the comparator, CO, is provided at a terminal 110.

The threshold level at terminal 108 is determined by a number of components and signals. A pair of resistors 112 and 114 form a voltage divider which would provide a predetermined threshold level in the absence of the signals. In addition, however, a threshold switch signal TS at terminal 116 is fed to an inverter 118, the output of which is coupled by a resistor 120 to the threshold input terminal 108. It will therefore be appreciated that if the threshold switch signal TS is low, the output of the inverter 118 will increase the threshold voltage at terminal 108.

The threshold voltage is also affected by a modulation signal M provided by an op-amp 122, the operation of which will be described later.

Figure 3:
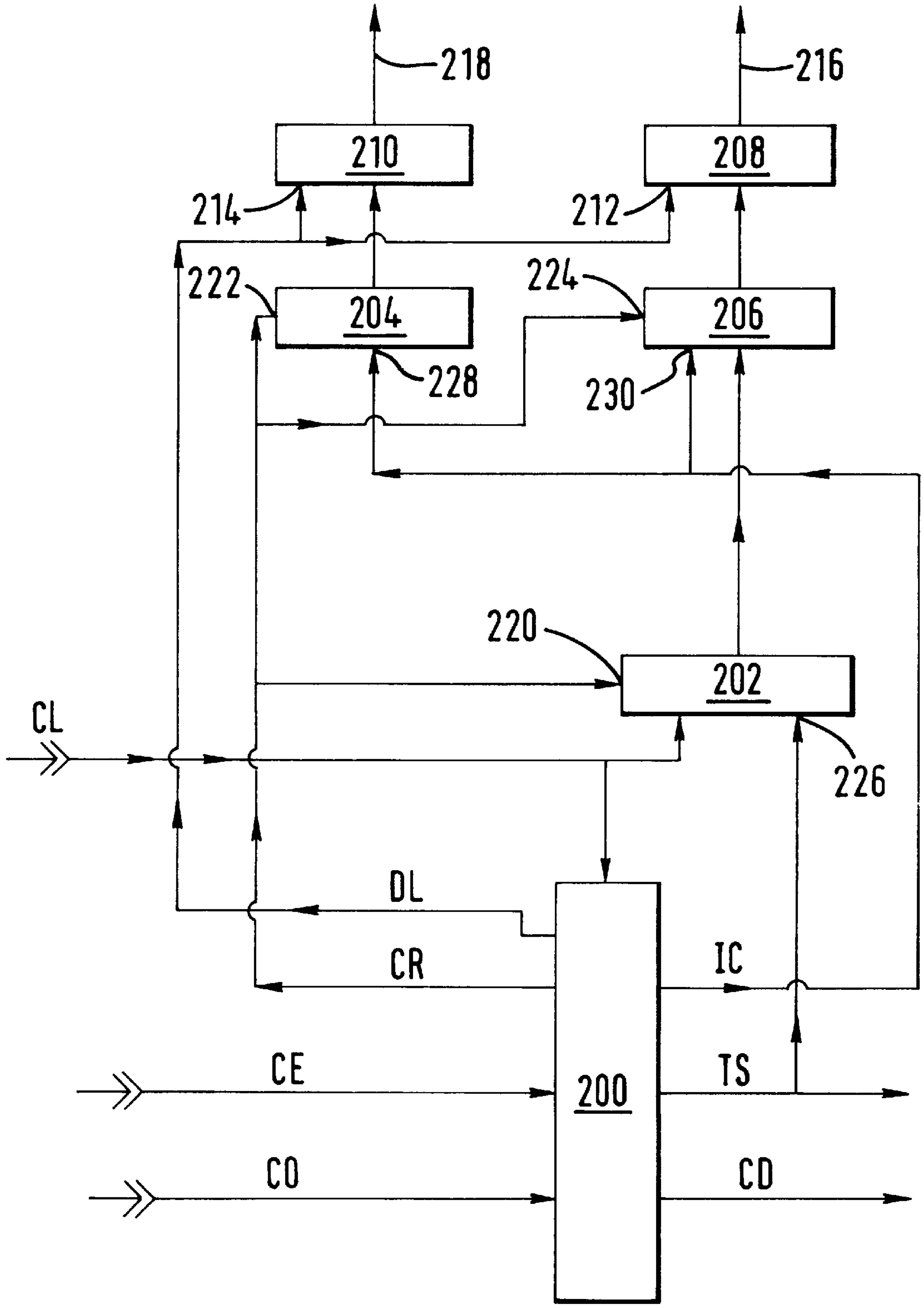
FIG. 3 is a block diagram of the control and counting parts of the circuit.

Referring to FIG. 3, a control circuit 200 of the validator responds to a cycle enable signal CE derived from the tachometer sensor 14 and to the comparator output CO by providing a number of timing signals, including a counter reset signal CR, a data latch signal DL, an integer clock signal IC, the threshold switch TS which is delivered to the circuit of FIG. 2 and a capacitor dump signal CD which is also delivered to the circuit of FIG. 2. The validator circuit also includes two counters, a period counter 202 and an integer counter 204, and three latches, comprising 16 bit latches 206 and 208 and a 12 bit latch 210. The circuit responds to a system clock signal CL.

The operation of the circuit will be described below with reference to FIGS. 2 and 3 and to the timing diagram of FIG. 4.

Upon receipt of the cycle enable signal CE, the control circuit 200 generates a capacitor dump signal CD and a data latch signal DL, both of which last for a brief interval. The data latch signal is delivered to latch inputs 212 and 214 of latch circuits 208 and 210 respectively, and thereby cause these latch circuits to store values corresponding to the current contents of the latch 206 and the counter 204, respectively. The outputs 216 and 218 of the latch circuits 208 and 210 will then represent the sensor measurement for the preceding measurement cycle, as will become clear from the following.

The capacitor dump signal CD is delivered to a terminal 140 of the circuit of FIG. 2, and switches on a transistor 124. This is connected between a supply voltage and the junction between the capacitor 102 and the sensor 24, and brings this junction substantially to the supply voltage, thereby substantially eliminating any charge stored by the capacitor 102. Accordingly, the voltage applied to the first input 104 of the comparator 106 will be substantially equal to the supply voltage.

As soon as the data latch signal terminates, the control circuit 200 generates a brief counter reset signal CR, which is delivered to reset terminals 220, 222 and 224 of the counters 202 and 204 and the latch 206 to reset the contents of all these to zero.

At the end of the capacitor dump signal CD, the transistor 124 is switched off, so that the voltage at the junction between the capacitor 102 and the sensor 24 starts to decrease as the capacitor 102 charges at a rate dependent on the intensity of the light received by the sensor. The resulting ramp signal R is shown in FIG. 4.

Figure 4:
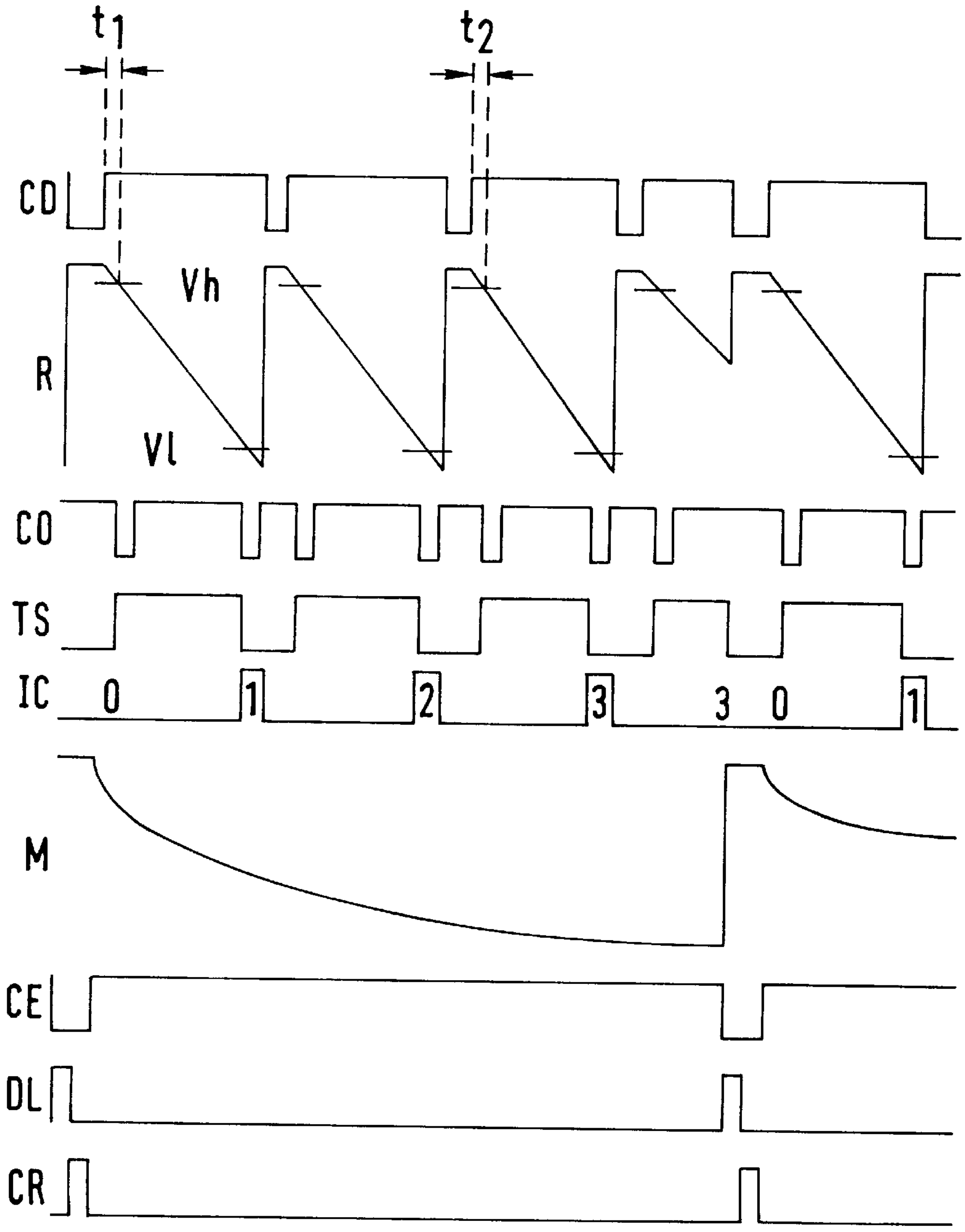
FIG. 4 is a timing diagram for the circuit.

When the ramp voltage R drops to the level of the threshold determined by the voltage divider 112 and 114, the comparator output signal CO goes low as indicated in FIG. 4. As soon as this happens, the control circuit 200 generates the threshold switch signal TS which is applied to the inverter 118 and which causes the threshold voltage applied to terminal 108 to drop from the previously high level Vh to a lower level Vl. The comparator output will then go high again, as indicated in FIG. 4.

The threshold switching signal TS is also delivered to an enable input 226 of the counter 202. The counter 202 then starts counting at the rate of the clock pulses CL.

The ramp voltage R continues to decrease, and eventually reaches the lower threshold Vl. At this point, the comparator output CO goes low again.

To avoid problems of possible multiple-switching due to the fact that the threshold voltage changes in the same sense as the ramp voltage R when the threshold is crossed, there is a short delay from the time that the comparator output changes and the changing of the threshold level. This delay defines the minimum cycle period.

Throughout the specification the term "light" is used to cover not only visible light, but also electromagnetic radiation of other wavelengths, for example infra-red and ultraviolet.

The control circuit 200 responds to the signal CO going low by terminating the threshold switch signal TS, which therefore stops the counting of the counter 202 and resets the high threshold at the input 108. At the end of the control switch signal TS, the control circuit generates a brief integer clock pulse IC, which is delivered to a count input 228 of the 12 bit integer counter 204 and increments the value stored therein. The integer clock signal IC is also delivered to a latch input 230 of the 16 bit latch 206, and this causes the contents of the counter 202 to be transferred to the latch 206.

The contents of the latch 206 will thus represent the time taken for the ramp signal to pass from the first threshold level Vh to the second threshold level Vl, and thus be representative of the intensity of the light received by the sensor 24.

The control circuit 200 is arranged to generate a new capacitor dump signal CD a short interval after the threshold switch signal TS goes low. This causes the capacitor to discharge rapidly through the transistor 124 and the ramp voltage thus to increase, so that a second charging operation can then take place.

The operation is therefore repeated, and at the end of this second charging operation the contents transferred from the counter 202 to the latch 206 will represent the total amount of time required for the ramp voltage to decrease from the higher to the lower threshold during the two cycles. The contents stored by the integer counter 204 will be equal to 2, i.e. the total number of completed cycles.

The process repeats until a further cycle enable signal is generated in response to a pulse from the detector 14. At that time, the contents of the latch 206 and the counter 204 are transferred to the latches 208 and 210, as mentioned previously. Any counting which has been performed by the counter 202 in response to the present, uncompleted, charge operation will be disregarded, because this would not yet have been transferred to the latch 206.

The current through the sensor will be predominantly proportional to the intensity of light, and inversely proportional to the time taken for the voltage of the capacitor to change from Vh to Vl. An accurate measurement of this time, and thus of the light intensity, can be deduced by dividing the total time taken during the completed cycles, i.e. the contents P of the latch 208, by the number I of the completed cycles as stored by the latch 210. The resolution of this measurement is not significantly affected by the light intensity, although the value I is strongly dependent on this.

The operation as described above disregards the effect of the modulation signal M. The purpose of this will now be explained.

Each individual timing measurement has an accuracy which is determined by the frequency of the clock signal CL. Assuming that the capacitor dump signal CD is synchronised with the clock signal, then a consistent sensor output will result in the comparator output changing at a consistent point within a clock period. Unless the time taken to pass between the thresholds is a precise multiple of the clock period, fractions of a clock period will be disregarded. This effect will be cumulative, which will result in a slight inaccuracy in the final measurement, although that measurement will nevertheless be substantially accurate and of high resolution.

To deal with this, the cycle enable signal CE is delivered to a terminal 126 of the circuit of FIG. 2, and this results in a transistor 138 being switched on to discharge a capacitor 130. After the cycle enable signal goes high, the transistor 128 is switched off and the capacitor 130 begins to charge through a resistor 132 so that the voltage on the capacitor and delivered to the op amp 122 gradually decreases. This produces the modulation signal M, which as shown in FIG. 4 starts high but gradually drops throughout the period when the measurement is made and when the capacitor 102 is being repeatedly charged and discharged. The modulation signal M slightly increases the threshold level applied to terminal 108 of comparator 106, so that during the course of the measurement period both threshold levels Vh and Vl tend to decrease slightly. The result of this is that the synchronisation between the clock signals and the time at which the comparator output changes is broken, so that for example the time $t_1$ between a capacitor dump signal and a subsequent threshold level Vh being reached is different from the corresponding time $t_2$ in a subsequent cycle. Accordingly, any fractional errors in the count reached during a charge cycle are averaged out over the course of the measurement period. The slope of the modulation signal M is sufficiently gradual that no significant errors arise from any non-linearity in the slope.

In this embodiment, the overall measurement period represents a predetermined spatial interval on the banknote and, preferably, a predetermined time interval, assuming that the banknote is driven at a constant speed. However, the present invention provides a method of maximising resolution irrespective of whether the speed is constant or not. The invention can however also be applied to arrangements in which a timer is used to trigger each measurement period, so that they occur at constant intervals.

In the preferred embodiment described above, each measurement is formed from an accumulation of individual measurements occurring during a respective charge/discharge cycle. Individual measurements are made only when the capacitor is charging (although they could equally well be made only when the capacitor is discharging by arranging for the discharge rate to be controlled by the sensor). In another embodiment, a charge storage device is both charged and discharged at a rate dependent on the sensor, so that a sawtooth-like wave is produced, and individual measurements are taken during both the charging and the discharging parts of the cycle.

In a further embodiment, a large-capacity charge storage device is used, and a comparator arrangement is arranged to detect multiple thresholds being reached as the device is charged (or discharged). The charging rate is such that the storage device is not completely charged (or discharged) even for the highest-value signal to be measured. A measurement can then be made by timing the period required for the charge level to pass between two adjacent thresholds, and adding this to the time required to pass between an indefinite number of further pairs of thresholds, the number depending upon the charge rate.

Instead of modulating the threshold values applied to the comparator 106, it would be possible instead to add a modulated current to the signal applied to the other input 104 of the comparator.

This embodiment avoids the need for electrical adjustment, and the cost of the electrical components used during adjustment. It therefore allows more time for measurements to be made, so that slower and less expensive analog-to-digital converters can be used. A slower converter also reduces noise problems. The invention also is capable of increasing the lifetime of the equipment because it is less subject to problems resulting from component deterioration.

The above-described embodiment produces a single measurement during each measurement period. It would be possible instead to have a continuous measurement, based on a rolling average of the count reached by the counter 202 during each individual charge/discharge cycle. If the rolling average is based on the individual measurements made throughout a predetermined interval, then the number of measurements contributing to the result will vary in accordance with the charge rate.

The specific embodiment has been described in connection with arrangements which detect light reflected from a banknote, but it is equally applicable to arrangements in which light is transmitted through the banknote. Indeed, it may have additional advantages in such arrangements, because sometimes it is necessary to take a direct measurement, without the presence of the banknote, for calibration or normalisation purposes. In this case, the received light intensity is far higher than with the banknote present, so there is a greater requirement for a large dynamic range.

In the embodiment, the charge or discharge rate of the capacitor is substantially proportional to the rate at which the capacitor is charged or discharged and thus the number of measurements made during the measurement period. Although it is preferred that the number of measurements increase with the charge rate, it is not necessary for them to be proportional to each other.

What is claimed is:

1. A method of making a photoelectric measurement in which the charge stored by a charge storage device is altered at a charge rate dependent on the intensity of light incident on a photosensor, the measurement being based on a value derived during a measurement interval and representative of the time taken for the charge level to change by a predetermined amount, wherein the measurement is based on an accumulation of a plurality of such values each derived during a respective measurement interval, the number of values varying with said charge rate.

2. A method as claimed in claim 1, wherein each value is derived during a respective charge or discharge cycle of the charge storage device.

3. A method as claimed in claim 1, wherein the measurement is obtained by counting at a predetermined rate during the periods when the charge is being altered.

4. A method as claimed in claim 3, wherein the counting during each measurement interval is started at a delay period following the initiation of a charge or discharge operation.

5. A method as claimed in claim 4, wherein the delay period is different for different measurement intervals.

6. A method as claimed in claim 1, wherein a comparator is used to detect the beginning and end of the measurement interval, the comparator being operable to compare the charge level with a threshold level, the method including the step of altering the threshold level applied to the comparator between a first level, for determining the beginning of the interval, and a second level, for determining the end of the interval.

7. A method of making a photoelectric measurement in which the charge stored by a charge storage device is altered at a charge rate dependent on the intensity of light incident on a photosensor, the measurement being based on a value derived during a measurement interval and representative of the charge level after a predetermined period, wherein the measurement is based on an accumulation of a predetermined plural number of such values each derived during a respective measurement interval.

8. A method as claimed in claim 7, wherein each value is derived during a respective charge or discharge cycle of the charge storage device.

9. A method as claimed in claim 7, wherein each predetermined period starts at a delay period following the initiation of a charge or discharge operation.

10. A method as claimed in claim 9, wherein the delay period is different for different measurement intervals.

11. A method as claimed in claim 7, wherein each measurement is obtained during a predetermined measurement period, and wherein for each measurement said number corresponds to the number of complete measurement intervals in the respective measurement period.

12. A method as claimed in claim 11, wherein the predetermined measurement period corresponds to a predetermined spatial scanning interval on an article being scanned.

13. A method as claimed in claim 11, wherein the predetermined measurement period corresponds to a predetermined time period.

14. A method of making a photoelectric measurement in which a charge storage device is charged or discharged at a charge rate dependent on the intensity of light incident on a photosensor, the measurement being based on a value representing the time taken for the charge level to change by a predetermined amount, wherein the time is determined by initiating the charging or discharging and measuring the interval between (i) the charge level subsequently reaching a first predetermined level and (ii) the charge level then reaching a second predetermined level.

15. A method as claimed in claim 14, wherein a comparator is used to detect the beginning and end of the measurement interval, the comparator being operable to compare the charge level with a threshold level, the method including the step of altering the threshold level applied to the comparator between a first level, for determining the beginning of the interval, and a second level, for determining the end of the interval.

16. A method as claimed in claim 14, including the step of simultaneously energizing a plurality of light sources using a common drive signal and simultaneously measuring light received from the sources via areas of an article.

17. A method as claimed in claim 16, including the step of making successive measurements each of a different spectral region.

18. A banknote validator comprising:
- a light emitting device for illuminating a banknote;
- an optical sensor for receiving light emitted from the light emitting device;
- a sensor circuit including a charge storage device whose charge varies at a rate dependent on the intensity of light incident on the sensor;
- a measurement circuit for receiving signals from the sensor and making a measurement therefrom, wherein the measurement is based on a plurality of values each of which is derived during a measurement interval and representative of the time taken for a charge level of the charge storage device to change by a predetermined amount, wherein the number of values varies with the charge rate.

19. The validator of claim 18 wherein each of the plurality of values is derived during a respective charge or discharge cycle of the charge storage device.

20. The validator of claim 18 further including a counter, wherein each measurement is obtained by counting at a predetermined rate during the periods when the charge is being altered.

21. The validator of claim 20 wherein the counting during each measurement interval is started at a delay period following the initiation of a charge or discharge operation.

22. The validator of claim 21 wherein the delay period is different for different measurement intervals.

23. The validator of claim 18 further including a comparator for detecting the beginning and end of the measurement intervals, wherein the comparator is operable to compare the charge level with a threshold level that can be altered between a first level for determining the beginning of the interval and a second level for determining the end of the interval.

24. The validator of claim 18 including:
- a plurality of light emitting devices for illuminating the banknote;
- a plurality of optical sensors for receiving light emitted from the light emitting devices; and
- a common drive circuit for simultaneously energizing the plurality of light emitting devices.

25. The validator of claim 18 including:
- a plurality of light emitting devices for illuminating the banknote with different spectral regions; and
- a drive circuit for energizing the plurality of light emitting devices to illuminate the banknote with the different spectral regions in succession.

26. A banknote validator comprising:
- a light emitting device for illuminating a banknote;
- an optical sensor for receiving light emitted from the light emitting device;
- a sensor circuit including a charge storage device whose charge varies at a rate dependent on the intensity of light incident on the sensor;
- a measurement circuit for receiving signals from the sensor and making a measurement therefrom, wherein the measurement is based on a plurality of values each of which is derived during a measurement interval and representative of the charge level of the charge storage device after a predetermined period.

27. The validator of claim 26 wherein each of the plurality of values is derived during a respective charge or discharge cycle of the charge storage device.

28. The validator of claim 26 wherein the counting during each measurement interval is started at a delay period following the initiation of a charge or discharge operation.

29. The validator of claim 26 wherein the delay period is different for different measurement intervals.

30. The validator of claim 29 wherein each measurement is obtained during a predetermined spatial scanning interval of an article being scanned.

31. The validator of claim 26 including:
- a plurality of light emitting devices for illuminating the banknote;
- a plurality of optical sensors for receiving light emitted from the light emitting devices; and
- a common drive circuit for simultaneously energizing the plurality of light emitting devices.

32. The validator of claim 26 including:
- a plurality of light emitting devices for illuminating the banknote with different spectral regions; and
- a drive circuit for energizing the plurality of light emitting devices to illuminate the banknote with the different spectral regions in succession.

* * * * *